Dec. 19, 1922.
Re. 15,509
H. RUEGG, JR.
HEDDLE.
FILED MAY 25, 1922.
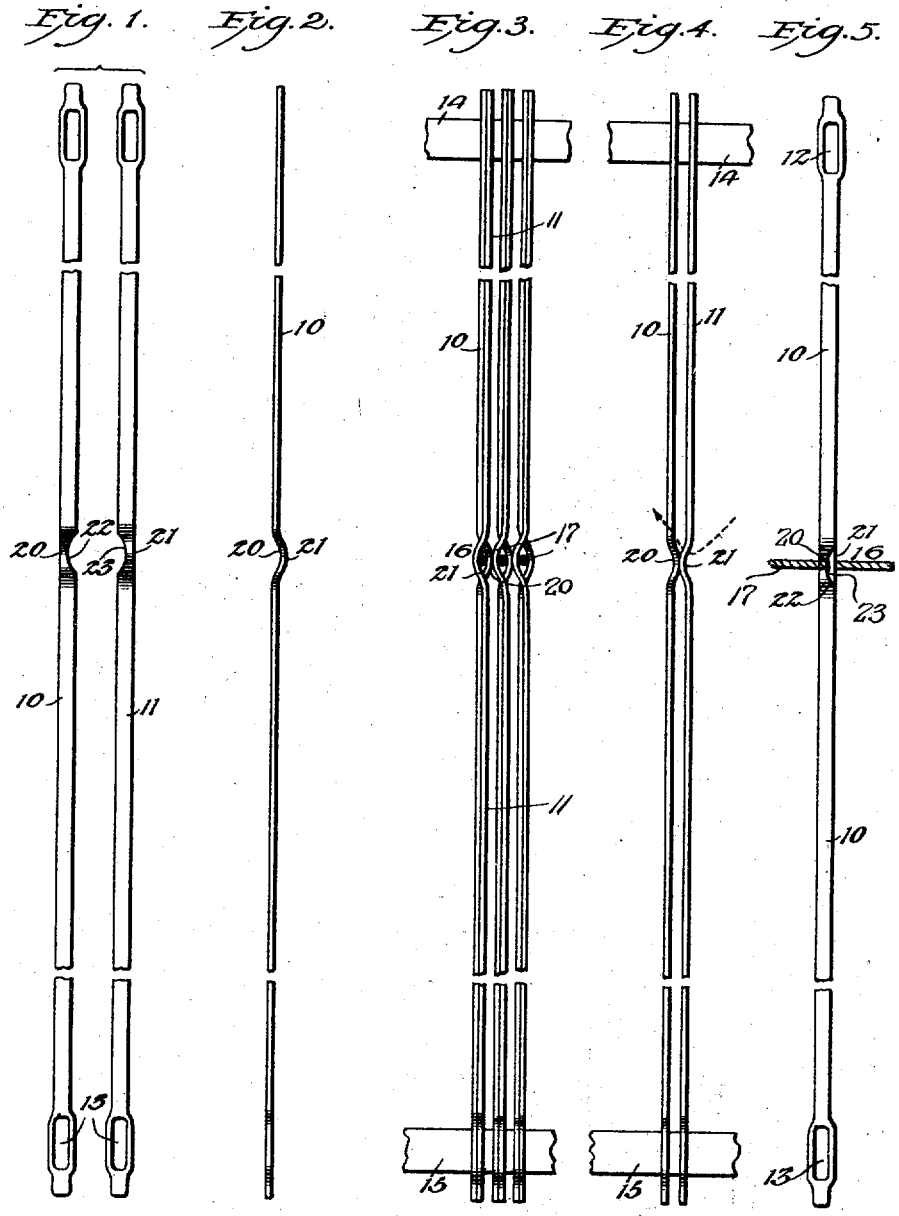
WITNESSES
J. Mank
A. L. Kitchin
INVENTOR
HENRY RUEGG, JR
BY Munn & Co.
ATTORNEYS Reissued Dec. 19, 1922. Re. 15,509

UNITED STATES PATENT OFFICE.

HENRY RUEGG, JR., OF WEEHAWKEN, NEW JERSEY.

HEDDLE.

Original No. 1,341,244, dated May 25, 1920, Serial No. 311,147, filed July 16, 1919. Application for reissue filed May 25, 1922. Serial No. 563,664.

*To all whom it may concern:*

Be it known that I, HENRY RUEGG, JR., a citizen of the United States, and a resident of Weehawken, in the county of Hudson and State of New Jersey, have invented a new and Improved Heddle, of which the following is a full, clear, and exact description.

The invention relates to looms and its object is to provide a new and improved heddle arranged to permit the weaver to readily engage a warp thread with the eye of the heddle without the use of a hook or similar tool.

Another object is to prevent the warp thread from passing accidentally out of the eye on raising and lowering of the heddle.

A further object is to provide a heddle in which are provided two superposed strips formed with means intermediate their ends acting as an eye for guiding the warp thread.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a face view of a pair of heddles formed of two strips arranged in disassembled position;

Fig. 2 is an edge view of one of the strips;

Fig. 3 is an edge view of the heddle;

Fig. 4 is a similar view of the same with the strips spread apart for the insertion of a warp thread; and Fig. 5 is a side elevation of the heddle with the strips in assembled position.

The heddle is formed of two strips 10 and 11, preferably made of metal and provided at their upper ends with openings 12 and at their lower ends with openings 13, the said openings 12 and 13 engaging the usual top and bottom heddle bars 14 and 15. The strips 10 and 11 are superposed and are formed with a structure intermediate their ends acting as an eye which is preferably bent and also notched to permit an easy passage of the warp without injuring the parts and without allowing the warp to drop down. The strips 10 and 11 form an eye 16 for the passage of the warp thread 17 and this eye is formed as follows: The strips 10 and 11 are provided with eye portions 20 and 21, bent transversely in opposite directions, and the bent portion of the strip 10 is provided at its rear edge with a cut-out portion or notch 22, and the bent portion 21 of the strip 11 is provided at its forward edge with a cut-out portion or notch 23. The bent portion 21 projects through the cut-out portion 22, and the bent portion 20 projects through the cut-out edge 23 thus permitting the bent portions 20 and 21 to cross each other with the strips 10 and 11 superposed, as plainly indicated in Figure 3.

It will be noticed that the strips 10 and 11 can be readily spaced apart, as indicated in Figure 4, to permit of passing a warp thread between the strips above or below the bent portions 20 and 21, and after the warp thread has been passed between the strips the warp is pulled between the bent portions 20 and 21 and the strips are released to allow the same to assume a superposed position with the bent portions 20 and 21 crossing each other thus confining the warp threads 17 in the eye 16 and preventing the warp thread from accidentally slipping out of the eye in an upward or downward direction. It is understood that as the bent portions cross each other the warp thread cannot leave the eye in an upward or a downward direction but the warp thread can readily pass lengthwise through the eye.

From the foregoing it will be seen that the weaver can readily engage a warp thread with the eye of a heddle without the use of a hook or a similar tool.

The heddle shown and described is very simple in construction and can be cheaply manufactured.

Having thus described my invention, I claim as new and desire to secure by Letters Patent:—

1. A heddle, comprising two superposed strips arranged in the plane of the warp thread, the strips having eye portions bent transversely in opposite directions and crossing each other, whereby a normally closed eye for the passage of the warp thread will be formed and the strips can be spaced apart to permit the thread to pass into said eye.

2. A heddle, comprising two superposed strips arranged in the plane of the warp thread, the strips having eye portions bent transversely in opposite directions and crossing each other, one of the said bent eye portions having its front edge cut out and the other bent eye portion having its rear edge cut out, the bent eye portion of one strip extending through the cut-out edge of the bent eye portion of the other strip thereby forming a normally closed eye for the passage of a warp thread.

3. A heddle, comprising two superposed strips arranged in the plane of the warp thread, said strips being formed with overlapping alined notches and means to readily engage a warp thread and guide the same, said strips being separable whereby the heddle may be threaded without the use of a hook or similar tool.

4. A heddle, comprising two superposed strips arranged in the plane of the warp thread, each strip being bent at a given point and having a notch at said bent point, said notches extending transversely of the strips and opening in opposite directions, the bent portions of the strip acting as an eye, the arrangement of said strips bent portions and notches being such that a warp thread may be placed in said eye without disconnecting the strips or without the use of hooks.

5. A heddle, comprising two superposed strips arranged in the plane of the warp thread, each strip having eye portions, one of said strips having its front edge cut out and the other of said strips having its rear edge cut out for forming said eye portions whereby a substantially closed eye is provided for the passage of a warp thread.

6. A heddle, comprising two superposed strips identical in construction, each strip having a notch in one edge, extending transversely of said strips and each of said strips at said notches being bent, the bent part of the respective strips being adapted to co-act for producing an eye when the strips are superposed.

HENRY RUEGG, JR.